United States Patent
Mhetar et al.

(10) Patent No.: US 7,230,046 B2
(45) Date of Patent: Jun. 12, 2007

(54) FLAME-RETARDANT POLYPHENYLENE ETHER COMPOSITIONS, AND RELATED ARTICLES

(75) Inventors: Vijay R. Mhetar, Slingerlands, NY (US); Jeffery Gary Tenenbaum, West Coxsackie, NY (US); Sumi, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/922,057

(22) Filed: Aug. 19, 2004

(65) Prior Publication Data

US 2006/0041046 A1  Feb. 23, 2006

(51) Int. Cl.
    *C08K 3/32* (2006.01)
(52) U.S. Cl. ...................... 524/415; 524/414
(58) Field of Classification Search ......... 524/414–415
    See application file for complete search history.

(56) References Cited

U.S. PATENT DOCUMENTS

| | | | |
|---|---|---|---|
| 4,079,022 A * | 3/1978 | Ferrarini et al. ............ 521/103 |
| 4,544,695 A | 10/1985 | Myers | |
| 4,808,647 A | 2/1989 | Abolins et al. | |
| 4,946,882 A | 8/1990 | Haaf et al. | |
| 5,071,894 A * | 12/1991 | Weil et al. ................. 524/127 |
| 5,294,654 A | 3/1994 | Hellstern-Burnell et al. | |
| 5,424,344 A * | 6/1995 | Lewin ......................... 524/83 |
| 5,552,092 A * | 9/1996 | Francis et al. ............. 264/1.24 |
| 6,166,115 A | 12/2000 | Landa | |
| 6,221,939 B1 | 4/2001 | Campbell et al. | |
| 6,355,586 B1 | 3/2002 | Usui et al. | |
| 6,576,700 B2 | 6/2003 | Patel | |
| 6,809,134 B2 * | 10/2004 | Greiner et al. .............. 524/101 |
| 6,995,204 B2 * | 2/2006 | Endou et al. .............. 524/417 |
| 2004/0167294 A1 * | 8/2004 | Endou et al. .............. 525/342 |
| 2005/0027048 A1 * | 2/2005 | Nakagawa et al. ......... 524/115 |

FOREIGN PATENT DOCUMENTS

| | | |
|---|---|---|
| EP | 0757072 | 2/1997 |
| EP | 1443075 | 8/2004 |
| EP | 1 502900 | 2/2005 |
| JP | 1997900335 A | 1/1997 |
| JP | 2001064524 A | 3/2001 |

OTHER PUBLICATIONS

Grant & Hackh's Chemical Dictionary, Fifth Edition, McGraw-Hill Book Company, New York, p. 277.*
The Condensed Chemical Dictionary, Tenth Edition Van Nostrand Reinhold Company, New York, p. 519.*
"Glass/Plastic—Hybrids: A New Class of High Performance Compounds", R. Greiner, Siemens AG, Erlangen (D), Apr. 26, 2004 (Date on which article obtained; publication status uncertain), (9 pages).
"Inorganic Flame Retardant for Polymers" (3 pages), Internet listing from "Yet2.com", printed on Feb. 12, 2004.
"Environmentally-Safe Flame Retardants for Polymers", Asahi Glass Co., (3 pages), Internet listing from "Yet2.com", printed on Feb. 12, 2004.
"Glass/Plastic Hybrid Compounds Offer Less Friction and Show Less Wear Than Fiber-Reinforced Plastics" (3 pages), Internet listing from "Yet2.com", printed on May 25, 2004.

* cited by examiner

*Primary Examiner*—Peter Szekely
(74) *Attorney, Agent, or Firm*—Cantor Colburn LLP

(57) ABSTRACT

A flame-retardant composition is described, containing a thermoplastic resin component which includes polyphenylene ether (PPE), along with a low-melting glass having a glass transition temperature (Tg) of less than about 500° C. The low-melting glass contains phosphate, and at least one of RO; $R'_2O$; $Al_2O_3$; $B_2O_3$; or $SO_3$, where R is a bivalent metal, while R' is an alkali metal. Related articles are also described.

36 Claims, No Drawings

FLAME-RETARDANT POLYPHENYLENE ETHER COMPOSITIONS, AND RELATED ARTICLES

BACKGROUND OF THE INVENTION

In a general sense, this invention relates to synthetic resins. More specifically, it relates to flame-retardant polyphenylene ether compositions.

Polyphenylene ether ("PPE") resins are commercially attractive materials because of their unique combination of physical, chemical, and electrical properties. The resins are usually characterized by a desirable combination of hydrolytic stability, high dimensional stability, toughness, heat resistance, and dielectric properties. They also exhibit high glass transition temperature values, typically in the range of about 150° C.–210° C., as well as good mechanical performance.

Polyphenylene ether-based resins are sometimes used for applications that require significant flame retardance. Examples include the construction and transportation industry. As one specific example, some of the PPE compositions can be used as insulating materials for electrical wire. Polyphenylene ether by itself is somewhat flame-retarding, and can be useful for certain end use applications. However, the combination of PPE with other polymers such as styrene resins can significantly decrease flame retardance, in the absence of flame-retardant additives.

A large number of flame-retardant additives and modifiers have been used in polyphenylene ether compositions. As one example, U.S. Pat. No. 4,808,647 (V. Abolins et al.) describes the use of a multi-component flame-retardant composition which includes an organic phosphate material. The compositions also include a brominated material, such as a tetrabromobisphenol-A oligomeric polycarbonate.

These types of compositions exhibit a number of desirable properties suitable for many applications. However, it is often desirable to minimize or eliminate the use of bromine or other halogen-containing additives in compositions designed for certain products. For example, the wire insulation compositions mentioned above frequently cannot contain halogen additives because they could form corrosive compounds when exposed to flame. The presence of the corrosive compounds may result in considerable damage to surrounding electrical equipment.

Flame-retardant compounds which are generally free of halogens are described in various references. For example, Patel (U.S. Pat. No. 6,576,700) describes the use of various classes of phosphorous-based flame-retardants in polyphenylene ether resins. Examples include elemental phosphorous, organic phosphonic acid, phosphonates, phosphinates, phosphinites, phosphine oxides, and phosphates. Of particular interest are a number of phosphates and diphosphates. Some of these are also described by Hellstern-Burnell et al, in U.S. Pat. No. 5,294,654. Examples include tetraphenyl bisphenol-A diphosphate; tetraphenyl resorcinol diphosphate; hydroquinone diphosphate; bisphenol-A polyphosphate; and the like.

The phosphorous-based compounds are often very effective for increasing the flame retardancy of PPE resins, as well as for resins based on PPE and high impact (rubber-modified) polystyrene (HIPS). However, as described in the Patel patent, the presence of phosphates and diphosphates—especially in large concentrations—can lower the heat deflection temperature (HDT) of the final product. A significant decrease in HDT characteristics is sometimes very unacceptable for a variety of end uses.

In addition to flame retardancy, PPE resins often need to exhibit a particular set of smoke characteristics under burning conditions. These characteristics are often critical when the compositions are used for products like wire insulation and ceiling tiles. The styrene content in many PPE formulations can undesirably increase smoke density. Moreover, the presence of large amounts of organic phosphate flame retardants (which may also function as aromatic plasticizers) can exacerbate smoke conditions in many situations.

It should thus be apparent that a need continues to exist for PPE compositions (with or without rubber-modified polystyrene or other polymers), which exhibit very good flame-retardant characteristics. Compositions of this type which do not rely on the use of large amounts of halogen-based flame retardants would also be welcome in the art. Furthermore, it would be particularly advantageous if flame-retardancy were achieved without a large decrease in high-heat properties, like HDT. Moreover, the compositions should also exhibit one or more desirable smoke characteristics, e.g., relatively low smoke density. It would often be advantageous if PPE compositions meeting this criteria were to also substantially retain other important characteristics as well, such as impact strength and hydrolytic stability.

BRIEF DESCRIPTION OF THE INVENTION

One embodiment of this invention is directed to a flame-retardant composition, comprising (a) a thermoplastic resin comprising a polyphenylene ether (PPE); and (b) about 0.05% by weight to about 80% by weight, based on the weight of the thermoplastic resin, of a low-melting glass having a glass transition temperature (Tg) of less than about 500° C.

The glass contains phosphate, and also contains at least one of RO; R'$_2$O; Al$_2$O$_3$; B$_2$O$_3$; or SO$_3$. R is a bivalent metal, while R' is an alkali metal.

In some embodiments, the thermoplastic resin component is predominantly PPE itself, with little or no polystyrene present. Such a resin component is sometimes substantially free of any other thermoplastic resins as well. In other embodiments, the resin component may contain a variety of other polymers, in addition to PPE.

Some embodiments of the present invention contain limited amounts of phosphate-based flame retardants, such as tetraphenyl resorcinol diphosphate. However, other embodiments are substantially free of phosphate-based flame retardants (other than phosphate-containing glass). The inventors have discovered that the presence of the low-melting glass can provide good flame retardancy for some end uses, while avoiding the drawbacks sometimes associated with using phosphate flame retardants. This discovery provides significant advantages in the case of the high-PPE thermoplastic compositions.

Other embodiments of the invention are directed to articles prepared from the flame-retardant composition. One example is an electrically conductive article which includes a metallic conductor. At least a portion of the surface of the conductor is covered by a layer of the flame-retardant composition described herein.

Further details regarding the various features of this invention are found in the remainder of the specification.

DETAILED DESCRIPTION OF THE INVENTION

The PPE resins for the present invention which are suitable for component (a) of this invention are generally known in the art. Many of them are described in U.S. Pat. Nos. 3,306,874; 3,306,875; and 3,432,469 (Hay); U.S. Pat. No. 4,806,602 (White et al); U.S. Pat. No. 4,806,297 (Brown et al); and U.S. Pat. No. 5,294,654 (Hellstern-Bumell et al), all incorporated herein by reference. Both homopolymer and copolymer polyphenylene ethers are within the scope of this invention.

The preferred PPE resins are homo- and copolymers which comprise a plurality of structural units of the formula

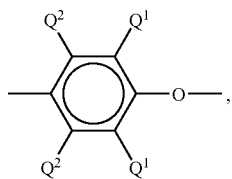

wherein each $Q^1$ is independently halogen, primary or secondary lower alkyl, phenyl, haloalkyl, aminoalkyl, hydrocarbonoxy, or halohydro-carbonoxy, wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Most often, each $Q^1$ is alkyl or phenyl, especially $C_{1-4}$ alkyl, and each $Q^2$ is hydrogen.

The preferred polyphenylene ethers are often comprised of units derived from 2,6-dimethyl phenol (e.g., for poly(2,6-dimethyl-1,4-phenylene ether)). Also preferred in some instances are PPE copolymers comprised of units derived from 2,6-dimethyl phenol and 2,3,6-trimethyl phenol. The PPE resins of this invention generally have a weight average molecular weight of about 20,000 to 80,000, as determined by gel permeation chromatography. Furthermore, they can be prepared by methods known in the art. One example is the oxidative coupling of an appropriate monohydroxyaromatic compound in the presence of a catalyst based on copper, manganese, or cobalt.

The polyphenylene ethers can be blended with many other materials which provide additional attributes. For example, they can be blended with a variety of vinyl aromatic resins. They can also be blended with polyamides, polyarylene sulfides, polyphthalamides, polyetherimides, polyolefins, polyesters; ABS copolymers (e.g., those based on grafts of styrene and acrylonitrile on a previously formed diene polymer backbone); polycarbonates; and with various mixtures and copolymers of any of these materials.

Various impact modifier resins can also be incorporated into the blends. Non-limiting examples include conjugated diene homopolymers and random copolymers (e.g., "A-B-A" and "A-B" block copolymers such as those based on butadiene and styrene); and core-shell graft copolymers of alkenylaromatic and conjugated diene compounds. Many of these polymers are described in U.S. Pat. Nos. 6,576,700; 6,221,939; 5,981,656; 5,859,130; 5,290,881; 5,916,970; 5,231,146; 5,237,005; and 4,946,882, all of which are incorporated herein by reference.

The vinyl aromatic resins (usually polystyrenes) are frequently blended with the PPE resins, and can be in both homopolymer and copolymer form. Copolymers may include the random, block or graft types. Examples of the homopolymers are amorphous polystyrene and syndiotactic polystyrene. Rubber-modified polystyrene resins like the HIPS materials mentioned above are often preferred.

The HIPS materials usually comprise blends and grafts wherein the rubber is a polybutadiene, or a rubbery copolymer of about 70–98% styrene and 2–30% diene monomer. Core-shell polymers, e.g., core-shell graft copolymers of alkenylaromatic and conjugated diene compounds, can also be blended with the PPE resins. Especially suitable are those comprising styrene blocks and butadiene, isoprene or ethylene-butylene blocks. Examples of suitable vinyl aromatic resins and core-shell polymers can be found in U.S. Pat. Nos. 4,684,696; 4,816,510; 5,294,653; and 6,576,700, all incorporated herein by reference.

The thermoplastic resin for this invention is usually a PPE composition. As used herein, the term "PPE composition" refers to a composition in which the thermoplastic component contains at least about 20% by weight polyphenylene ether, based on total resin content. Moreover, in some preferred embodiments, the thermoplastic resin component is predominantly PPE itself. For example, the thermoplastic resin component may sometimes contain at least about 90% by weight, and most preferably, at least about 95% by weight PPE, with little or no polystyrene present. Such a material can be very useful in certain high heat applications in which the presence of polystyrene or modified polystyrene would cause serious smoke emission problems under combustion conditions. In some embodiments, the level of PPE is at least about 98% by weight. These compositions are often substantially free of any other thermoplastic resins as well.

The low-melting glass of the present invention contains phosphate, usually in the form of $P_2O_5$. The glass further contains at least one of the following components: RO; $R'_2O$; $Al_2O_3$; $B_2O_3$; or $SO_3$. In the formula "RO", R is at least one bivalent metal. The preferred bivalent metals are Mg, Ca, Zn, Sn, and Ba. The presence of zinc oxide, ZnO, is particularly preferred for some embodiments. In the formula "$R'_2O$", R' is at least one alkali metal, e.g., Li, Na, and K. The amount of the phosphorous component in the glass is usually in the range of about 10 mole % to about 60 mole %, calculated as $P_2O_5$. In some preferred embodiments, the level of phosphorous is in the range of about 15 mole % to about 45 mole %. Non-limiting examples of the low-melting glass used in this invention are provided in U.S. patent application Ser. No. 10/772,525, filed on Nov. 28, 2003, and incorporated herein by reference.

A variety of specific glass compositions are suitable for the present invention. Some of them include the following components:
- about 15 mole % to about 45 mole % $P_2O_5$;
- about 3 mole % to about 60 mole % RO;
- about 3 mole % to about 40 mole % $R'_2O$; and
- about 3 mole % to about 25 mole % $B_2O_3$.

These compositions may also include at least one of $Al_2O_3$ and $SO_3$. Examples of the some of the more specific, zinc-containing glass compositions are as follows: $P_2O_5$—ZnO—$R'_2O$; $P_2O_5$—ZnO—$SO_3$; and $P_2O_5$—ZnO—$Al_2O_3$. Additional metal oxides are also sometimes present in any of these glass compositions. Examples include oxides of one or more elements selected from the group consisting of Sr, Ti, Fe, Co, Ni, Cu, Zr, Mn, and Mo.

In some preferred embodiments, the glass composition includes the following:
- about 15 mole % to about 30 mole % $P_2O_5$;
- about 10 mole % to about 55 mole % ZnO;

about 0 mole % to about 15 mole % of at least one RO compound other than ZnO;

about 5 mole % to about 35 mole % of at least one compound of the formula R'$_2$O;

about 1 mole % to about 5 mole % Al$_2$O$_3$;

about 8 mole % to about 20 mole % B$_2$O$_3$; and about 3 mole % to about 30 mole % SO$_3$.

Another preferred glass composition includes primarily three components, each at a similar level:

about 30 mole % to about 35 mole % P$_2$O$_5$;

about 30 mole % to about 35 mole % ZnO; and about 30 mole % to about 35 mole % SO$_3$ This type of material is preferably free of any halogenated compounds. In some preferred embodiments, the material is also free of heavy metal oxides like PbO and BaO. It may contain minor amounts of some of the other glass components described herein.

The low-melting glass of the present invention has a glass transition temperature (Tg) of less than about 500° C., and usually, greater than about 200° C. In preferred embodiments, the Tg is in the range of about 250° C. to about 400° C. (The Tg can be adjusted, in part, by varying the glass ingredients, which have different, individual melting points).

If the Tg of the glass is too high, the glass may remain relatively solid at elevated temperatures, i.e., the combustion temperatures for the compositions. It would therefore be difficult for the glass to melt and effectively form a protective coating on the thermoplastic resin. Conversely, if the Tg of the glass is too low, the glass may prematurely melt when the thermoplastic resin is subjected to flame or combustion-conditions. In that instance, the glass may provide flame retardance at lower temperatures, but may begin to flow excessively at higher temperatures, due to the viscosity decrease. Thus, the glass will not remain coated on the thermoplastic resin, and its beneficial effect on flame retardance and smoke suppression may be somewhat compromised. (However, in some instances, there may be some benefit to using glass with a Tg in the lower region of the ranges stated above, e.g., about 200° C. to about 300° C. Such a material might desirably melt while being extruded, and could result in a final material with other desirable properties, like abrasion resistance, dimensional tolerance, and low coefficient of thermal expansion (CTE)). Those skilled in the art will be able to select the most appropriate Tg, based on a variety of factors. They include the specific composition of the PPE-containing thermoplastic resin; and the performance requirements for its intended end use.

In some embodiments, the glass component is treated with a surface-treatment agent. These agents are known in the art and described in many references. General examples include U.S. Pat. Nos. 6,492,028 and 5,648,169, which are incorporated herein by reference. (Some of the additives are referred to as "sizing agents"). Non-limiting examples of the surface-treatment agents include coupling agents, film-formers, lubricants, antistatic agents, and mixtures thereof.

Examples of the coupling agents include silane coupling agents (often preferred), borane coupling agents, or titanate coupling agents. Specific examples of the silane coupling agents are: amino silanes, epoxy silanes, and acrylic silanes. Examples of the film-formers include polymers such as vinyl acetates, urethanes, acrylics, polyesters, polyethers, phenoxy resins, polyamides, epoxies, polyolefins, and modified versions of these polymers. Non-limiting examples of the lubricants include fatty acid ester surfactants, fatty acid ether surfactants, as well as various aromatic ethers and aromatic esters. Examples of the antistatic agents include inorganic salts, e.g., lithium chloride or potassium iodide; and quaternary ammonium salts, e.g., ammonium chlorides or ammonium ethosulfates.

The surface-treatment agent improves the adhesion of the glass to the thermoplastic resin. In this manner, voids at the interface of the two components are minimized or avoided. The voids would otherwise hinder melting of the glass during combustion of the thermoplastic resin, making it less likely that the desirable, protective film of glass would form on the resin. (The surface-treatment agent may also improve the handling efficiency of the glass, by decreasing the generation of static electricity). The amount of surface-treatment agent employed is usually in the range of about 0.1 weight % to about 5.0 weight %, based on the weight of the glass component after application. In preferred embodiments, the surface-treatment agent is combined with the glass, prior to mixing of the latter with the thermoplastic resin.

The low-melting glass component could be used in a variety of forms. They include pellets, granular form, and powder form. However, powder form is preferred in most situations. Usually, the powder has an average particle size no greater than about 10 microns. This size helps to ensure intimate contact with the resin. It also permits rapid melting of the glass when the resin undergoes combustion, thereby allowing for rapid formation of the protective glass film on the resin. The average particle size is often in the range of about 2 microns to about 5 microns.

The most appropriate amount of low-melting glass employed will depend on a variety of factors. They include: the specific composition of the PPE-containing thermoplastic resin; the specific composition of the glass; the presence or absence of other flame retardant compounds; the smoke density requirements for the resin product; its desired end use; and the remaining property requirements for that end use (e.g., HDT, impact strength, and the like).

Usually, the glass is present at a level of about 0.05% by weight to about 25% by weight, based on the weight of the thermoplastic resin. (However, for some end-uses, the glass may be present at a level of up to about 80% by weight, e.g., when properties like abrasion resistance or dimensional tolerance are especially important during molding or use). More often, the minimum level of glass is at least about 0.5% by weight, and the maximum level of the glass is typically about 10% by weight. In some preferred embodiments, the glass is present at a maximum level of about 5% by weight.

Moreover, in some especially preferred embodiments, it is desirable to use no greater than about 2% by weight glass. (For example, this is often the case when the thermoplastic resin component contains very high levels of PPE, e.g., greater than about 90% by weight). The present inventors were surprised to discover that this limited amount of glass enhances some of the flame-retardant properties, such as flame-out time, as compared to the use of greater amounts of the glass.

The low-melting glass component can be prepared by conventional techniques, such as those described in U.S. Pat. No. 4,544,695 (Myers), incorporated herein by reference. Usually, the individual glass constituents are ground together, along with any additives which are being used. The grinding step is often carried out in a ball mill, for a time period sufficient to bring the glass particles to the desired particle size (usually, a free-flowing powder). As an alternative to dry grinding, the glass can be ground as a slurry in a suitable medium, such as ethanol or a Freon® material.

The glass composition can then be melted and subsequently solidified, to form a glass cullet. According to one exemplary procedure, the ground glass components and additives are added to a high-temperature vessel (e.g., formed of porcelain), and heated at an elevated temperature. The specific temperature will depend on the glass constituents. An exemplary range is from about 480° C. to about 650° C., although significantly higher or lower temperatures may be used. A clear melt is generally formed. The melt is then quenched at a temperature below its liquidus temperature. A clear, colorless glass is thus formed, although any color which may be present is dependent on glass content.

In some embodiments (especially when vinyl aromatic resins are present), the compositions of this invention may further include limited amounts of other flame retardants. Usually, the other flame retardants are substantially free of halogen compounds. Phosphate-based flame-retardant compounds are often preferred, as described in the patent referenced above, U.S. Pat. No. 6,576,700. Examples include elemental phosphorous, organic phosphonic acids, phosphonates, phosphinates, phosphinites, phosphine oxides such as triphenylphosphine oxide, phosphines, phosphates; and the phosphate compounds themselves (e.g., triphenyl phosphate). The phosphates are especially preferred for many embodiments.

A wide variety of diphosphates and polyphosphates can be used as the flame retardant. Many are described in U.S. Pat. Nos. 5,011,736 and 5,294,654, incorporated herein by reference. Non-limiting, specific examples of the flame retardants include: bis-neopentyl piperidinyl diphosphate; tetraphenyl bisphenol-A diphosphate; tetraphenyl resorcinol diphosphate; hydroquinone diphosphate; bisphenol-A polyphosphate; and mixtures of any of these compounds. Tetraphenyl resorcinol diphosphate (RDP) is especially preferred in some embodiments. Polymeric counterparts of the compounds may also be used. Moreover, methods for the preparation of di- and poly-functional aromatic phosphates are described in British Patent No. 2,043,083. (Another example of a suitable phosphate-based flame retardant is a mixture of tri(aryl) phosphate (e.g., triphenyl phosphate) and alkylated derivatives thereof. An example of this type of material is the diphenyl t-butylphenyl phosphate fluid, commercially known as Stauffer 71B™).

The total amount of the optional phosphorous-based flame retardant depends on various factors, such as the amount of low-melting glass present; the presence or absence of polymeric materials blended with the PPE resin; the thermal requirements for the polymer product, e.g., in terms of HDT; as well as other physical requirements, such as impact strength and low-temperature ductility. In those instances in which vinyl aromatic or rubber-modified vinyl aromatic resins are present, the phosphorous-based flame retardant is usually present at a level of no greater than about 30% by weight, based on 100% (i.e., 100 parts) of total resin, e.g., PPE, vinyl aromatic resin, and any other resins. The minimum level (when present) is usually about 0.1% by weight.

In some preferred embodiments, the level of the phosphorous-based flame retardant is no greater than about 20% by weight, based on total resin. In the situation where PPE constitutes substantially all of the thermoplastic resin, the phosphorous-based flame retardant is usually present at a maximum level of about 5% by weight, based on 100% of the resin. In other preferred embodiments for such a PPE polymer system, the phosphorous flame retardant (other than the phosphate-containing glass) is absent from the composition.

The compositions of this invention may also include effective amounts of a variety of additives, all known in the art. Non-limiting examples include dyes, pigments, colorants, lubricants, heat stabilizers, ultraviolet light stabilizers, processing stabilizers, antioxidants, antistatic agents, plasticizers, fillers, reinforcing agents; anti-drip agents, processing aids, mold release agents, and various combinations thereof. The levels of effectiveness can be determined without undue experimentation, but usually ranges, for each additive, from about 0.1% by weight to about 10% by weight, based on the weight of the entire composition. In the case of additives like the fillers and reinforcing agents, the level (for each) may be higher, e.g., up to about 60% by weight.

A particularly preferred reinforcing agent for some embodiments of this invention is glass fiber. The glass fiber can greatly increase flexural strength and modulus, while also increasing tensile strength. The fiber can be in various forms, e.g., glass roving or cut fibers. Suitable types of glass fiber are described in various references, such as U.S. Pat. No. 5,294,654, referenced above. Use of this fiber is particularly advantageous in compositions which contain a high proportion of PPE (e.g., about 90% or more by weight) as the thermoplastic resin component. In that instance, the glass fiber is often present at a level of about 1% by weight, up to about 60% by weight, based on the weight of the entire composition. In preferred embodiments, the glass fiber is present at a level of about 20% by weight to about 40% by weight, and most preferably, about 30% by weight to about 40% by weight.

The components in the composition of this invention can be combined in any conventional manner. For example, they can be mixed by using a roll mill, Banbury mixer, or extruder, as well as any combination of these techniques. Mixing temperatures depend in part on the type and amount of constituents, but are typically in the range of about 240° C. to about 320° C. Mixing is carried out for a period of time sufficient to ensure that the glass component is thoroughly dispersed within the thermoplastic polymer. Care should also be taken to ensure that any additives are thoroughly incorporated into the composition. Materials like glass fibers are often incorporated later in the mixing stage, e.g., via a downstream port when an extruder is employed.

It should be clear from the discussion above that another embodiment of this invention is directed to articles prepared from the flame-retardant composition described previously. The articles can be made by any conventional technique known in the art. Non-limiting examples include injection molding, thermoforming, blow-molding, calendering, and the like.

Some of the articles which benefit most from the base material of this invention are those which have very specific requirements for flame retardancy, smoke-retardancy, or a combination of the two attributes. Such articles are in use in many different areas: building materials, automobile or mass-transport vehicles; aerospace; electrical products, and the like. Many specific uses for the flame-retardant compositions are possible. Some of the specific end uses are described in the above-referenced patent to Campbell et al, U.S. Pat. No. 6,221,939. A few, non-limiting examples are as follows: wire coatings, heat-insulation materials, ceiling and wall tiles for residential and commercial structures; television and computer monitors; electronic switches, switch-housings, plugs, connectors, sockets, and the like; automotive electrical components; computer housings; and lighting fixtures.

EXAMPLES

The examples which follow are merely illustrative, and should not be construed to be any sort of limitation on the scope of the claimed invention.

A phosphate-type glass was obtained for use in the present invention. The glass was in powder form. It had an average particle size of about 3–4 microns. The glass transition temperature (Tg) of the glass sample was about 350–370° C., while its melting temperature (Tm) was in the range of about 490–550° C. As analyzed, the glass had the following composition, in terms of mole percent:

about 23.3% $P_2O_5$;
about 40.7% ZnO;
about 8.9% $B_2O_3$;
about 9.8% $SO_3$;
about 4.9% $Na_2O$;
about 5.7% $K_2O$;
about 4.8% $Li_2O$;
about 1.8% $Al_2O_3$;
about 0.01% MgO; and
about 0.05% CaO.

A mono-aminosilane coupling agent was combined with the glass, functioning as a surface-treatment agent. The amount of the coupling agent was about 2.0 weight %, based on the total solids weight of the agent and the glass.

Notched Izod test for impact strength was carried out according to ASTM 256 (73° F./23° C., 0.125 inch/0.32 cm, 2 ft. lb hammer).

Flame testing was carried out according to the UL94 Vertical Burn protocol. The protocol calls for bar-shaped specimens of dimension 5" (12.7 cm)×0.5" (1.3 cm) width, multiplied by the desired normal thickness. A flame having an inner cone of height ¾" (1.9 cm) is applied to each specimen so that a distance of ⅜" (1.0 cm) separates the lower end of the specimen from the base of the flame. The flame is held in that position for 10 seconds, and then removed. A burn-time is defined as the time required for the flame issuing from the specimen to disappear. If burning of the specimen ceases within 30 seconds, the flame is reapplied for an additional 10 seconds. The criteria for V-0, V-1, and V-2 ratings are generally standard, as described in U.S. Pat. No. 6,576,700.

Smoke emission testing (i.e., for smoke generation-suppressing properties) was carried out according to ASTM-E662. The test specimens had the following dimensions: 3 inch×3 inch (7.6 cm×7.6 cm)×2.5 mm thickness. The measurements were conducted in "flaming mode". A $D_{max}$ value for maximum specific optical density was recorded for each sample.

The test results are set forth in Table 1:

TABLE 1

| # | PPE (%) | HIPS (%) | RDP[a] (%) | GLASS (%)[b] | FOT (sec)[c] | F.R.[d] | Dmax[e] | IZOD (ft-lb/in) | HDT (° C.)[f] |
|---|---|---|---|---|---|---|---|---|---|
| 1 | 100 | 0 | 0 | 0 | 13.3 | V1 | 684 | 4.8 | 186 |
| 2 | 99.5 | 0 | 0 | 0.5 | 6.4 | V0 | 342 | 3.6 | 185.5 |
| 3 | 98 | 0 | 0 | 2 | 8.1 | V1 | 289 | 3.7 | 187 |
| 4 | 95 | 0 | 0 | 5 | 7.4 | V0 | 216 | 3.8 | 186.5 |
| 5 | 50.45 | 27.99 | 16.68 | 0 | 6.4 | V0 | 625 | 20 | 84 |
| 6 | 50.45 | 27.99 | 12.5 | 0 | 10.5 | V1 | 565 | 22 | 94 |
| 7 | 50.45 | 27.99 | 12.5 | 1 | 7.1 | V0 | 505 | 15 | 94.8 |
| 8 | 50.45 | 27.99 | 12.5 | 5 | 5.6 | V0 | 385 | 13.9 | 98.7 |
| 9 | 50.45 | 29.99 | 12.5 | 10 | 4.4 | V0 | 275 | 12.1 | 100.2 |

[a]Tetraphenyl resorcinol diphosphate
[b]Phosphate-type, low-melting glass
[c]Flame-Out Time, in seconds.
[d]UL94 Flame Retardancy, as described above.
[e]ASTM-E662, as described above.
[f]Degrees Centigrade at 264 psi.

A standard polyphenylene ether resin (poly(2,6-dimethyl-1,4-phenylene) ether resin) was used in this example, having an intrinsic viscosity (IV) of 0.46 dl/g, as measured in chloroform at 25° C. The high-impact polystyrene material listed in Table 1 was grade GEH-1897, from GE Plastics, and contained 90% by weight styrene, and 10% by weight rubber. The tetraphenyl resorcinol diphosphate (RDP) was a commercial material sold under the name Fyroflex RDP, and obtained from Akzo Nobel.

The components listed in Table 1 were first combined in a dry mixer. The combined material was then extruded on a twin screw extruder under vacuum (300° C. barrel temperature, at a screw rate of 300 rpm). The extruded material was pelletized into ⅛ inch (0.32 cm) pellets, which were then injection-molded into specimens.

Heat deflection temperature (HDT) measurements for the test specimens were carried out according to a procedure based on ASTM D648 (264 psi, 0.25 inch/0.64 cm). The It is apparent from the data in Table I that the presence of the low-melting glass in the high-PPE content-samples significantly improved flame-retardance, in terms of burn times according to the UL-94 protocol. As shown by the results for sample 2, a relatively small level of the glass component provided a V0 flame rating and a large decrease in flame-out time, without a significant loss in heat deflection temperature. Another very significant result was the large, beneficial decrease in $D_{max}$ (specific optical density). While there is also a decrease in Izod value, the overall impact strength characteristics are still very acceptable for many end use applications.

Sample 3 also exhibited improvement in flame-out time, as compared to sample 1, although the improvement was not as significant as in the case of sample 2. Sample 4 also exhibited significant improvement in flame-out time, as compared to sample 1. Moreover, these improvements were achieved while very good HDT values were maintained, as in the case of sample 2.

A significant benefit is also shown for the PPE/HIPS samples (which typically are utilized in lower heat applications, and have lower HDT values). In regard to a comparison of sample 5 with sample 7, it can be seen that the presence of the low-melting glass resulted in the very desirable V0 flame rating, while reducing the level of phosphate flame retardant needed for the composition. The HDT value also increased by over 10° C., which is important for many commercial applications. While there was a decrease in the Izod value, the overall impact strength is still high enough to meet the performance specifications for many products.

The addition of 1% of the low-melting glass in sample 7 resulted in a beneficial decrease in the $D_{max}$ value (specific optical density), as compared to sample 6. There was an even greater decrease in $D_{max}$ values when 5% of the glass was used (sample 8), and when 10% of the glass was used (sample 9). These improvements are significant for end use applications with rigorous smoke standards under burning conditions. The present invention allows one to obtain the benefits of styrene components in PPE compositions, while minimizing the smoke-related problems associated with using styrene.

This invention has been described according to specific embodiments and examples. However, various modifications, adaptations, and alternatives may occur to one skilled in the art without departing from the spirit and scope of the claimed inventive concept. All of the patents, articles, and texts which are mentioned above are incorporated herein by reference.

What is claimed is:

1. A thermoplastic composition comprising:
   a thermoplastic component; and
   a single flame retardant component,
   wherein the thermoplastic component comprises at least 90 percent by weight, based on total thermoplastic content, of polyphenylene ether; and
   wherein the single flame retardant component consists of a glass having a glass transition temperature of less than 500° C. and wherein the glass comprises:
   (i) $P_2O_5$; and
   (ii) at least one constituent selected from the group consisting of RO; $R'_2O$; $Al_2O_3$; $B_2O_3$; and $SO_3$; wherein R is a bivalent metal and R' is an alkali metal and the glass has been surface treated with a surface treatment agent selected from the group consisting of coupling agents, film-formers, lubricants, antistatic agents, and mixtures thereof.

2. The flame-retardant composition of claim 1, wherein R is selected from the group consisting of Mg, Ca, Zn, Sn, and Ba.

3. The composition of claim 2, wherein R is Zn.

4. The composition of claim 1, wherein R' is selected from the group consisting of Li, Na, and K.

5. The composition of claim 1, wherein the glass comprises about 10 mole % to about 60 mole % $P_2O_5$.

6. The composition of claim 1, wherein the glass comprises a material selected from the group consisting of $P_2O_5$—ZnO—$R'_2O$; $P_2O_5$—ZnO—$SO_3$; and $P_2O_5$—ZnO—$Al_2O_3$.

7. The composition of claim 1, wherein the glass comprises:
   about 15 mole % to about 45 mole % $P_2O_5$;
   about 3 mole % to about 60 mole % RO;
   about 3 mole % to about 40 mole % $R'_2O$; and
   about 3 mole % to about 25 mole % $B_2O_3$.

8. The composition of claim 7, wherein the glass further comprises at least one of $Al_2O_3$ or $SO_3$.

9. The composition of claim 8, wherein at least a portion of RO comprises ZnO.

10. The composition of claim 7, wherein the glass further comprises at least one metal oxide of an element selected from the group consisting of Sr, Ti Fe, Co, Ni, Cu, Zr, and Mo.

11. The composition of claim 1, wherein the glass comprises:
    about 15 mole % to about 30 mole % $P_2O_5$;
    about 10 mole % to about 55 mole % ZnO;
    about 0 mole % to about 15 mole % of at least one RO compound other than ZnO;
    about 5 mole % to about 35 mole % of at least one compound of the formula $R'_2O$;
    about 1 mole % to about 5 mole % $Al_2O_3$;
    about 8 mole % to about 20 mole % $B_2O_3$; and
    about 3 mole % to about 30 mole % $SO_3$.

12. The composition of claim 1, wherein the glass comprises:
    about 30 mole % to about 35 mole % $P_2O_5$;
    about 30 mole % to about 35 mole % ZnO; and
    about 30 mole % to about 35 mole % $SO_3$.

13. The composition of claim 1, wherein the glass is in powder form.

14. The composition of claim 13, wherein the powder has an average particle size no greater than 10 microns.

15. The composition of claim 1, wherein the thermoplastic component comprises at least one polymer or copolymer selected from the group consisting of vinyl aromatic resins, polyamides, polyarylene sulfides, polyphthalamides, polyetherimides, polyolefins, polyesters, acrylonitrile-butadiene-styrene (ABS) copolymers, polycarbonates, and combinations thereof.

16. The composition of claim 15, wherein the vinyl aromatic resin is rubber-modified.

17. The composition of claim 1, further comprising at least one additive selected from the group consisting of dyes, pigments, colorants, lubricants, heat stabilizers, ultraviolet light stabilizers, processing stabilizers, antioxidants, antistatic agents, plasticizers, fillers, reinforcing agents, antidrip agents, processing aids, mold release agents, and impact modifier resins.

18. The composition of claim 17, wherein the reinforcing agent comprises glass fiber.

19. The composition of claim 1, wherein the polyphenylene ether comprises poly(2,6-dimethyl-1,4-phenylene ether).

20. An article made from the flame-retardant composition of claim 1.

21. An electrically conductive article, comprising a metallic conductor, at least a portion of the surface of which is covered by a layer of a flame-retardant composition which comprises:
    (a) a thermoplastic resin comprising a polyphenylene ether; and
    (b) about 0.05% by weight to about 5% by weight, based on the weight of the thermoplastic resin, of a single flame retardant, wherein the single flame retardant is a glass having a glass transition temperature (Tg) of less than about 500° C., and comprising:
    (i) $P_2O_5$; and
    (ii) at least one constituent selected from the group consisting of RO; $R'_2O$; $Al_2O_3$; $B_2O_3$; and $SO_3$; wherein R is a bivalent metal and R' is an alkali metal and the glass has been surface treated with a surface treatment agent selected from the group consisting of coupling agents, film-formers, lubricants, antistatic agents, and mixtures thereof.

22. The article of claim 21, wherein the thermoplastic resin further comprises at least one rubber-modified vinyl aromatic resin.

23. A thermoplastic composition consisting essentially of:
a thermoplastic component; and
a single flame retardant component,
wherein the thermoplastic component comprises at least 90 percent by weight of polyphenylene ether based on total thermoplastic content; and
wherein the single flame retardant component consists of a glass having a glass transition temperature of less than 500° C. and wherein the glass comprises
(i) $P_2O_5$; and
(ii) at least one constituent selected from the group consisting of RO; $R'_2O$; $Al_2O_3$; $B_2O_3$; and $SO_3$; wherein R is a bivalent metal and R' is an alkali metal and the glass has been surface treated with a surface treatment agent selected from the group consisting of coupling agents, film-formers, lubricants, antistatic agents, and mixtures thereof.

24. The composition of claim 23, wherein the glass comprises:
about 15 mole % to about 45 mole % $P_2O_5$;
about 3 mole % to about 60 mole % RO;
about 3 mole % to about 40 mole % $R'_2O$; and
about 3 mole % to about 25 mole % $B_2O_3$.

25. The composition of claim 24, wherein the glass further comprises at least one of $Al_2O_3$ or $SO_3$.

26. The composition of claim 24, wherein at least a portion of RO comprises ZnO.

27. The composition of claim 24, wherein the glass further comprises at least one metal oxide of an element selected from the group consisting of Sr, Ti Fe, Co, Ni, Cu, Zr, and Mo.

28. The composition of claim 23, wherein the glass comprises:
about 15 mole % to about 30 mole % $P_2O_5$;
about 10 mole % to about 55 mole % ZnO;
about 0 mole % to about 15 mole % of at least one RO compound other than ZnO;
about 5 mole % to about 35 mole % of at least one compound of the formula $R'_2O$;
about 1 mole % to about 5 mole % $Al_2O_3$;
about 8 mole % to about 20 mole % $B_2O_3$; and
about 3 mole % to about 30 mole % $SO_3$.

29. The composition of claim 23, wherein the glass comprises:
about 30 mole % to about 35 mole % $P_2O_5$;
about 30 mole % to about 35 mole % ZnO; and
about 30 mole % to about 35 mole % $SO_3$.

30. The composition of claim 23, wherein the glass is in powder form.

31. The composition of claim 30, wherein the powder has an average particle size no greater than 10 microns.

32. The composition of claim 23, wherein the single thermoplastic component further comprises at least one polymer or copolymer selected from the group consisting of vinyl aromatic resins, polyamides, polyarylene sulfides, polyphthalamides, polyetherimides, polyolefins, polyesters, acrylonitrile-butadiene-styrene (ABS) copolymers, polycarbonates, and combinations thereof.

33. The composition of claim 32, wherein the vinyl aromatic resin is rubber-modified.

34. The composition of claim 23, further comprising at least one additive selected from the group consisting of dyes, pigments, colorants, lubricants, heat stabilizers, ultraviolet light stabilizers, processing stabilizers, antioxidants, antistatic agents, plasticizers, fillers, reinforcing agents, anti-drip agents, processing aids, mold release agents, and impact modifier resins.

35. The composition of claim 34, wherein the reinforcing agent comprises glass fiber.

36. A thermoplastic composition consisting of:
about 60 to about 99.5 percent by weight of polyphenylene ether;
about 0.5 to about 10 percent by weight of a glass having a glass transition temperature of less than 500° C. and comprising:
(i) $P_2O_5$; and
(ii) at least one constituent selected from the group consisting of RO; $R'_2O$; $Al_2O_3$; $B_2O_3$; and $SO_3$; wherein R is a bivalent metal and R' is an alkali metal and the glass has been surface treated with a surface treatment agent selected from the group consisting of coupling agents, film-formers, lubricants, antistatic agents, and mixtures thereof,
wherein weight percent is based on the total weight of the composition.

* * * * *